United States Patent
Moroz et al.

(10) Patent No.: US 7,118,338 B2
(45) Date of Patent: Oct. 10, 2006

(54) METHODS AND APPARATUS FOR TWIST BEND COUPLED (TCB) WIND TURBINE BLADES

(75) Inventors: Emilian Mieczyslaw Moroz, San Diego, CA (US); David Lawrence LeMieux, Boulder, MT (US); Kirk Gee Pierce, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 10/880,732

(22) Filed: Jun. 30, 2004

(65) Prior Publication Data

US 2006/0002794 A1 Jan. 5, 2006

(51) Int. Cl.
*F03D 7/04* (2006.01)
(52) U.S. Cl. ............... 416/1; 416/30; 416/41; 416/43; 416/230; 416/240
(58) Field of Classification Search .......... 416/1, 416/30, 41, 43, 47, 233, 230, 240, 238
See application file for complete search history.

(56) References Cited

U.S. PATENT DOCUMENTS

| 4,037,988 A | 7/1977 | Laird |
| 4,389,162 A | 6/1983 | Doellinger et al. |
| 5,269,657 A | 12/1993 | Garfinkle |
| H2057 H * | 1/2003 | Veers et al. ............ 416/230 |

* cited by examiner

*Primary Examiner*—Edward K. Look
*Assistant Examiner*—Richard A. Edgar
(74) *Attorney, Agent, or Firm*—James E. McGinness, Esq.; Armstrong Teasdale LLP

(57) ABSTRACT

A method for controlling a wind turbine having twist bend coupled rotor blades on a rotor mechanically coupled to a generator includes determining a speed of a rotor blade tip of the wind turbine, measuring a current twist distribution and current blade loading, and adjusting a torque of a generator to change the speed of the rotor blade tip to thereby increase an energy capture power coefficient of the wind turbine.

33 Claims, 6 Drawing Sheets

METHODS AND APPARATUS FOR TWIST BEND COUPLED (TCB) WIND TURBINE BLADES

STATEMENT REGARDING FEDERALLY SPONSORED RESEARCH & DEVELOPMENT

The U.S. Government has certain rights in this invention as provided for by the terms of Contract No. DE-AC36-83CH10093, Subcontract No. ZAM-7-13320-26 awarded by the Department of Energy/Midwest Research Institute, National Renewable Energy Laboratory Division.

BACKGROUND OF THE INVENTION

This invention relates generally to wind turbines, and more particularly to methods and apparatus for increasing energy capture and for controlling twist angles of blades resulting from passive twist bend coupling.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted within a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid.

Studies have shown benefits of passive pitch control of rotor blades (i.e., twist-bend coupling, or TBC) to attenuate extreme blade loads. Within a twist-bend coupled section of a rotor blade that is made of laminate material, the laminates of the blade undergo shear fatigue resulting from continuous passive pitching. This fatigue presents a risk to TBC technologies. However, very little, if any, research has been devoted to the study of how laminates used in the manufacturing of rotor blades respond to shear axis fatigue.

At least one known wind turbine utilizes torsionally stiff blades without twist-bend coupled blades. Only a single tip speed ratio (i.e., rotation rate divided by wind speed) is tracked and used to maintain a maximum power coefficient. More specifically, rotor speed rises with wind speed in such a manner as to maintain an optimized or nearly optimized tip speed ratio over a certain period of time. Tip speed ratio is known in the industry and is generally a limiting factor in blade rotational design. This limit results from aerodynamic noise.

At least one known wind turbine uses twist-bend-coupled blades that passively pitch to feather a relatively small amount when loaded by aerodynamic loads. Particularly in response to strong wind gusts, this passive pitch tends to balance out asymmetric loads across the rotor disk and reduces system fatigue damage. However, due to passive pitching of the TBC, energy capture below rated wind speed is reduced slightly compared to a non-coupled blade with an identical aerodynamic envelope. More specifically, optimum pitch setting for maximum energy capture varies with wind speed. To partially compensate for the loss of energy capture, at least one known configuration provides a pre-twist (i.e., a twist bias built into the rotor blades), but this bias is most effective at only one wind speed. Energy loss still occurs at other wind speeds. However, pre-twist in the TBC section mitigates power loss at below-power rated wind speeds.

For large-scale wind turbines, rotor blades require pitch actuation at the blade root to actively adjust the pitch angle or angle-of-attack of the rotor blade. However, during operation, fine pitching of the outboard section of the rotor blade can be achieved through passive pitching by means of a Twist-Bend Coupling (TBC). Passive pitching of a several degrees is achieved in the TBC by means of blade construction and specifically due to laminates orientation and lay-up. For example, in the TBC section the fiber matt material is orientated to allow the blade to passively pitch under specific loading conditions. This pitching reduces aerodynamic lift by passively pitching slightly towards a feathered position and therefore reduces blade loading. TBC is a feature that has been shown to reduce the demand on the active pitch mechanism, which is typically located at the root of the rotor blade. Thus passive TBC can reduce pitching power requirements and associated fatigue and damage to the active pitch axis system, located near the blade root.

BRIEF DESCRIPTION OF THE INVENTION

In some aspects, the present invention therefore provides a method for controlling a wind turbine having twist bend coupled rotor blades on a rotor mechanically coupled to a generator. The method includes determining a speed of a rotor blade tip of the wind turbine, measuring a current twist distribution and current blade loading, and adjusting a torque of a generator to change the speed of the rotor blade tip to thereby increase an energy capture power coefficient of the wind turbine.

Also, some aspects of the present invention provide a twist-bend coupled rotor blade for a wind turbine. The rotor blade includes a leading edge and a trailing edge, a laminate lay-up configured for twist-bend coupling, a passive twist-bend coupling section, one or more shear webs inside the rotor blade, and a twist-bend control system inside the passive twist-bend coupling section.

In still other aspects, the present invention provides a wind turbine having twist bend coupled rotor blades on a rotor mechanically coupled to a generator. The wind turbine also has a controller that is configured to determine a speed of a tip of a rotor blade, measure a current twist distribution and current blade loading, and adjust a torque of the generator to change the speed of the rotor blade tip to thereby increase an energy capture power coefficient of the wind turbine.

In yet other aspects, the present invention provides a wind turbine having a generator, a rotor mechanically coupled to the generator, and twist-bend coupled rotor blades on the rotor. The blades include a leading edge and a trailing edge, a laminate lay-up configured for twist-bend coupling, a passive twist-bend coupling section, one or more shear webs inside the rotor blade, and a twist-bend control system inside the passive twist-bend coupling section.

It will be appreciated that configurations of the present invention not only provide wind turbines with greater energy capture, but also mitigate risks associated with shear fatigue of laminates used in twist bend coupled rotor blades.

DETAILED DESCRIPTION OF THE INVENTION

Figure 1:
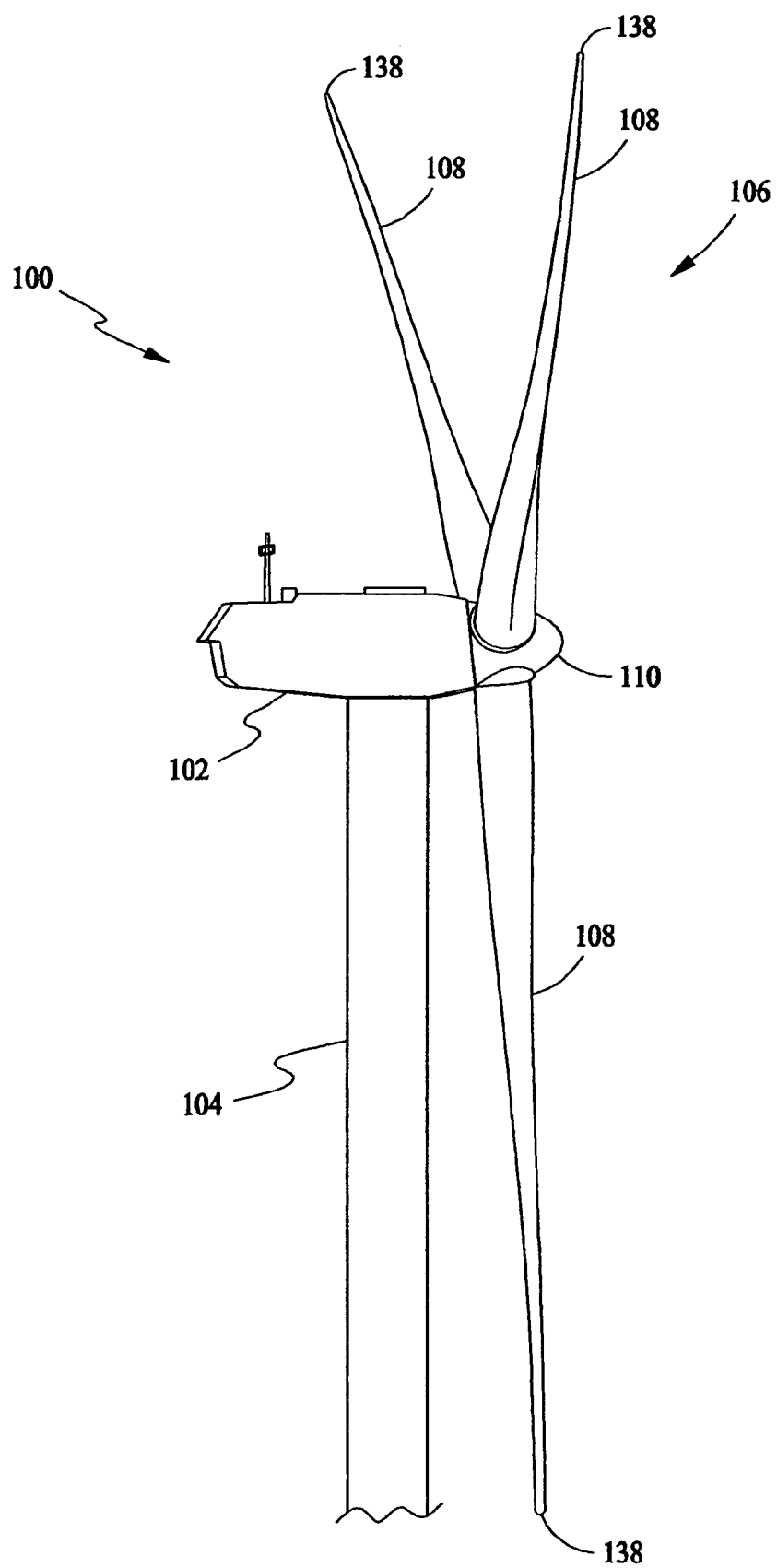
FIG. 1 is a drawing of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
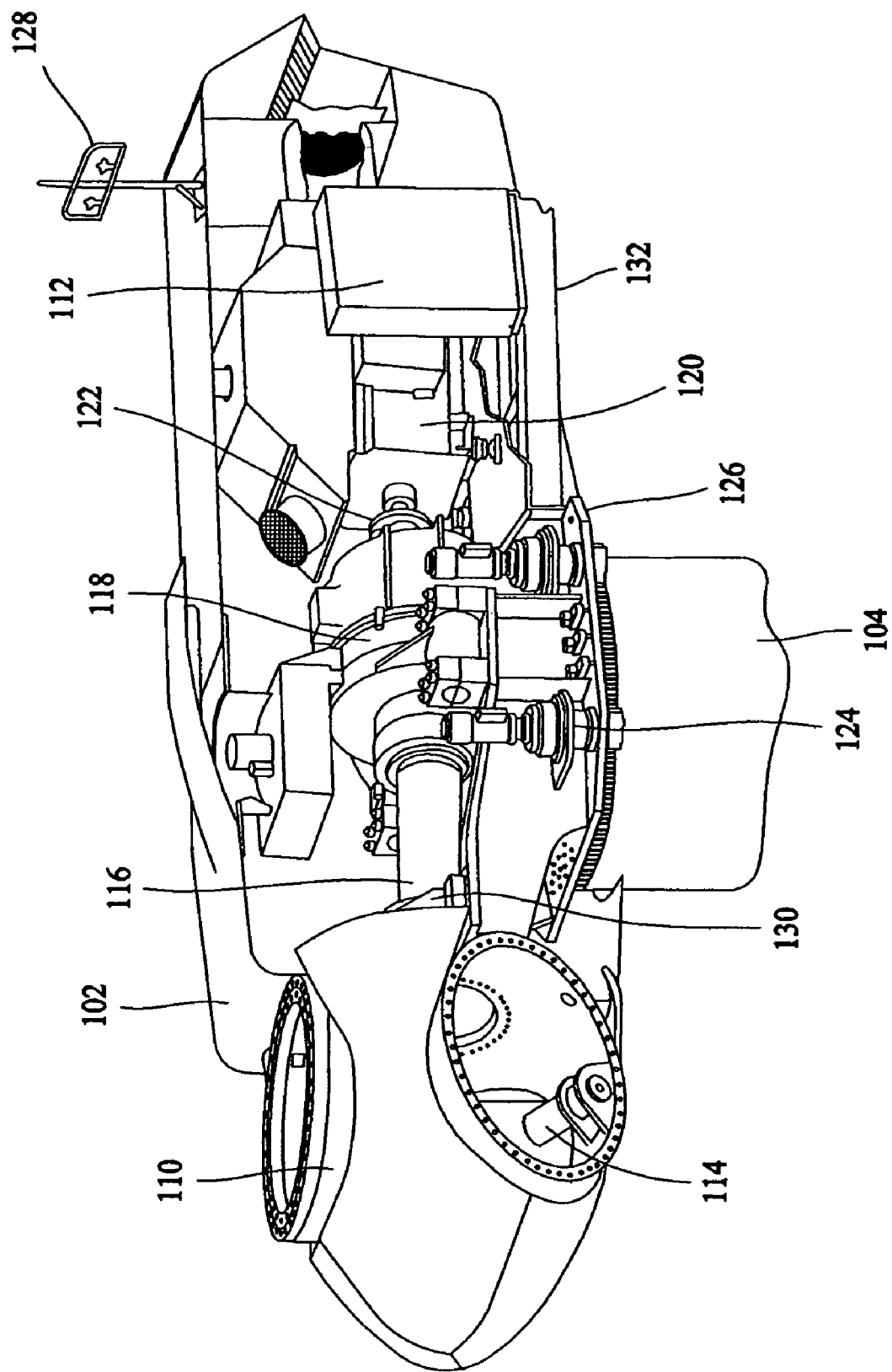
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 and supported by a main bearing 130 and, at an opposite end of shaft 116, to a gear box 118. Gear box 118, in some configurations, utilizes a dual path geometry to drive an enclosed high speed shaft. The high speed shaft (not shown in FIG. 2) is used to drive generator 120, which is mounted on main frame 132. In some configurations, rotor torque is transmitted via coupling 122. Generator 120 may be of any suitable type, for example, a wound rotor induction generator.

Yaw drive 124 and yaw deck 126 provide a yaw orientation system for wind turbine 100. Wind vane 128 provides information for the yaw orientation system, including measured instantaneous wind direction and wind speed at the wind turbine. In some configurations, the yaw system is mounted on a flange provided atop tower 104.

Figure 3:
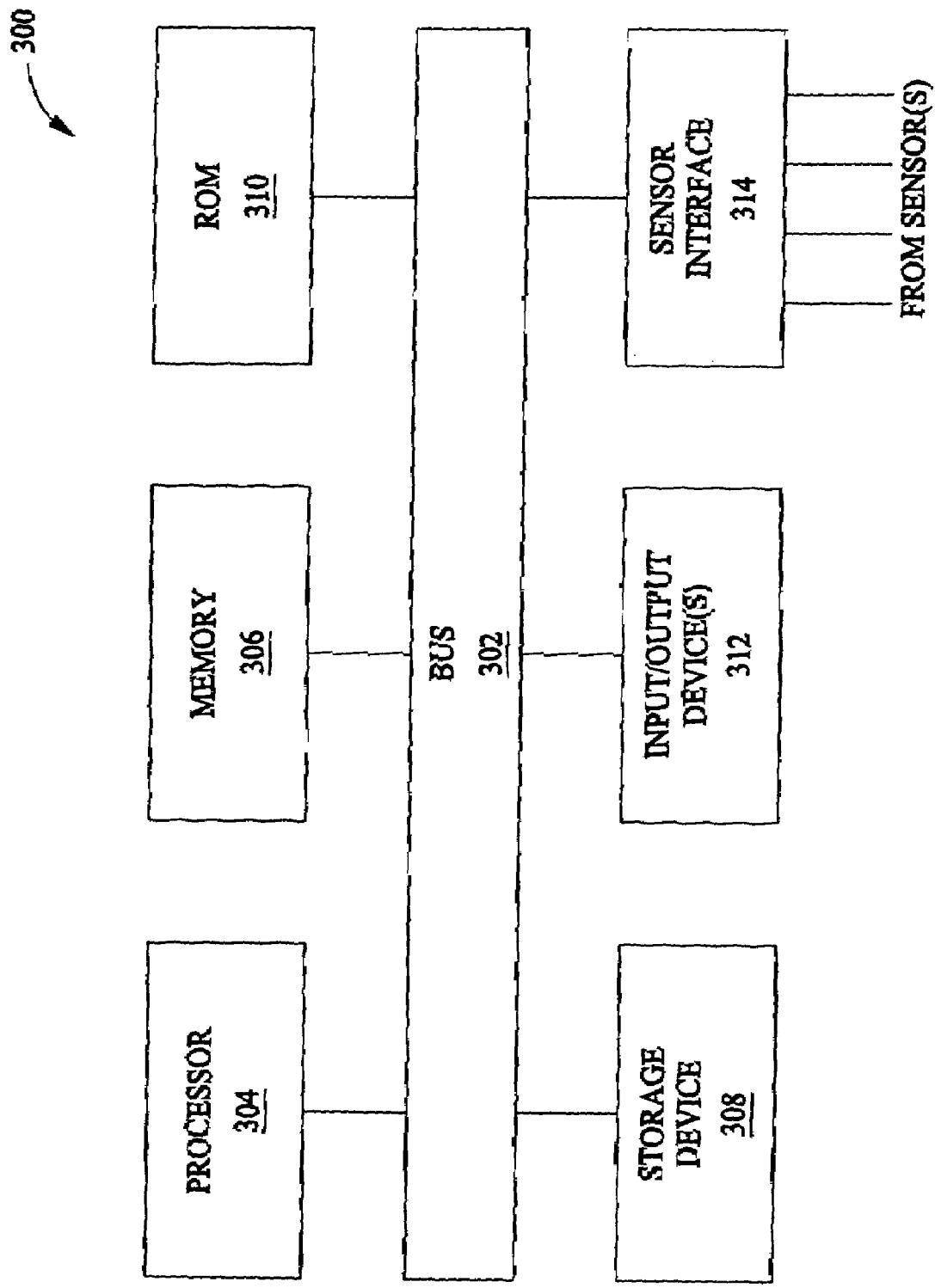
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hardwired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
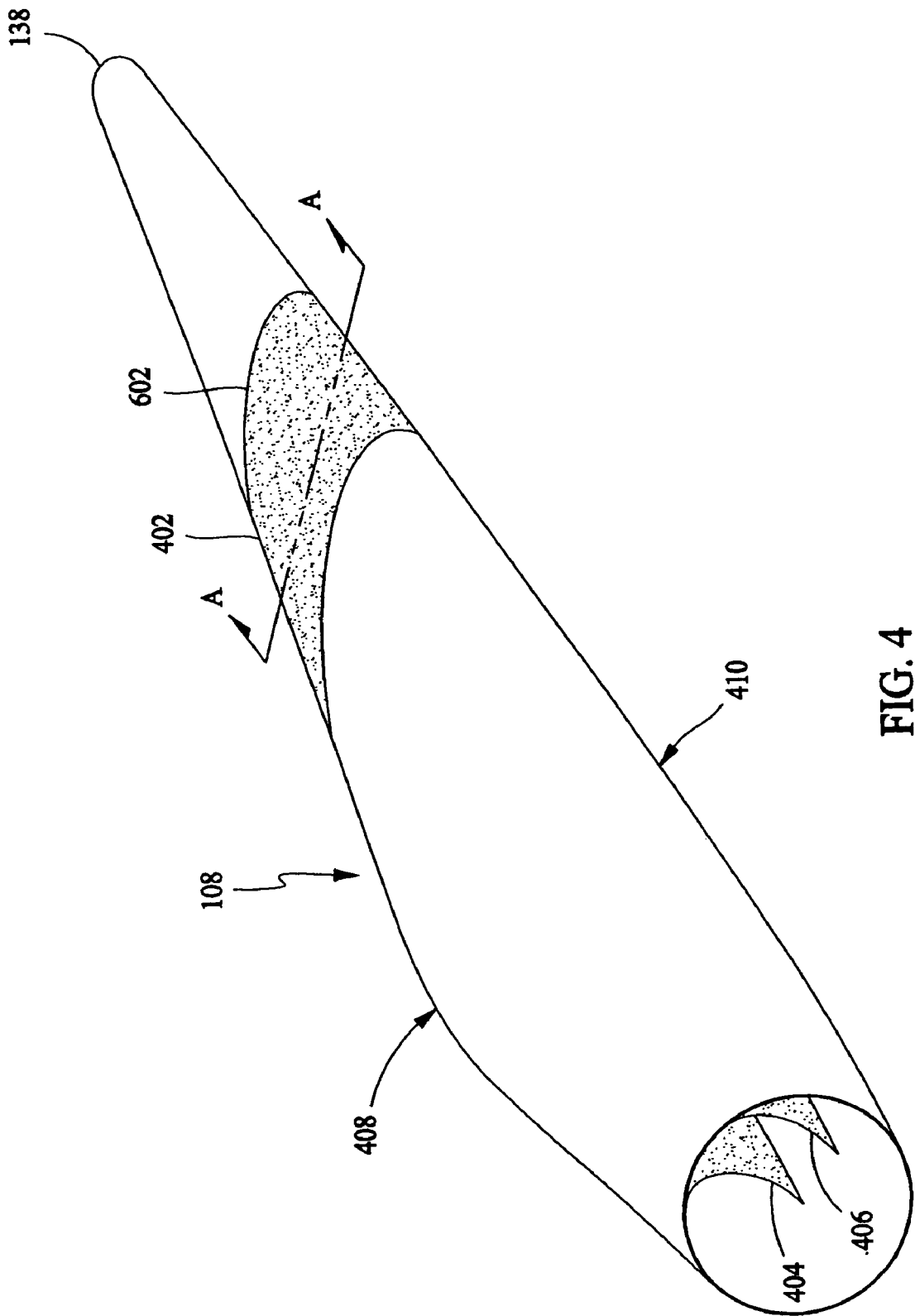
FIG. 4 is a perspective view of a rotor blade having a passive twist-bend coupled section and two shear webs.
Figure 5:
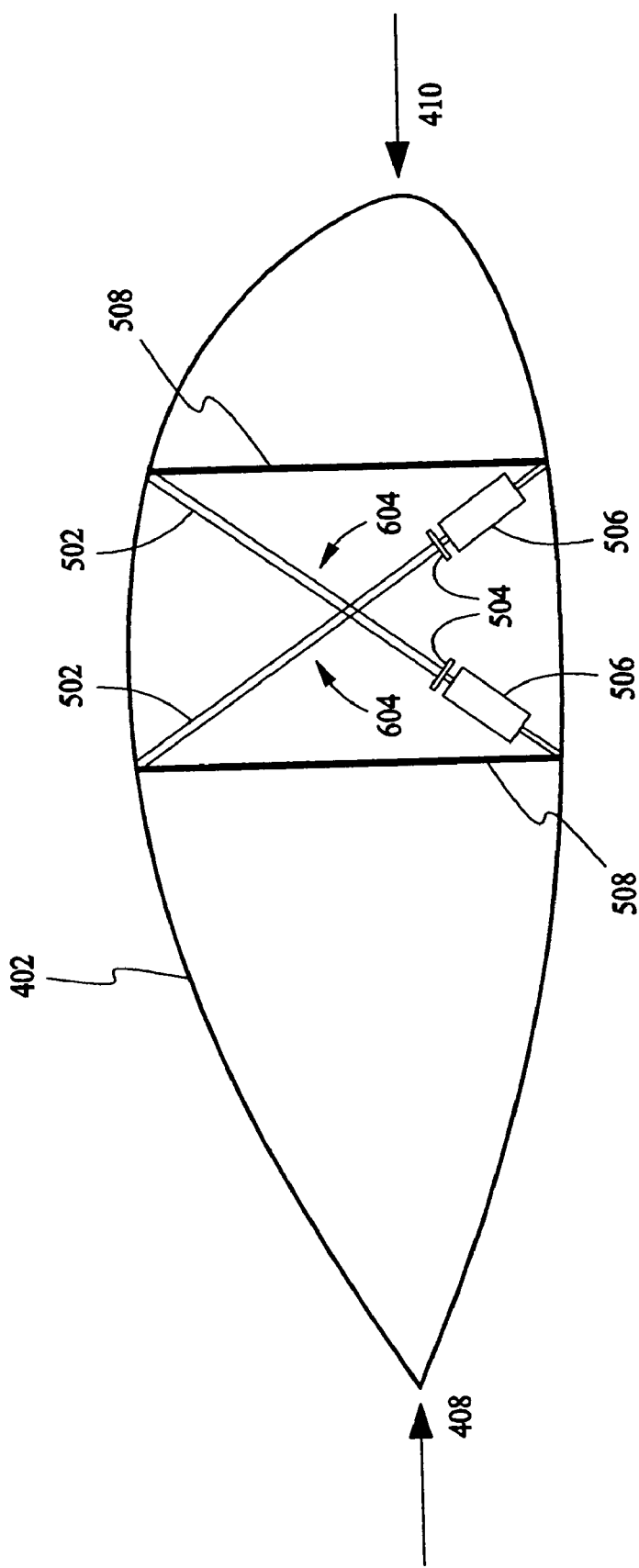
FIG. 5 is a cross-sectional view of the rotor blade at line A—A of FIG. 4.

In some configurations of the present invention, a bend-twist-coupled blade is provided that changes its aerodynamic twist as it is loaded. For example and referring to FIG. 1 and FIG. 4, a rotor blade 108 is provided having a passive TBC section 402 and one or more shear webs (for example, two shear webs 404 and 406). FIG. 5 shows a section A-A of blade 108 in greater detail. An optimum pitch setting for maximum energy capture varies in wind turbines 100 having blades 108 with twist bend coupling. However, to avoid loss of energy capture, the speed of a blade tip 136 is tracked and varied for maximum or at least favorable power coefficient by adjusting rotor 106 speed (i.e., rotation rate). In some configurations, this adjustment is made by using optical sensors 138 or any other suitable sensors to measure tip 136 speed as rotor 106 rotates. In some configurations, hub rotational speed is known from an encoder on a high speed shaft connected to the aft end of the generator, and blade length, which is known, is used to determine tip speed. This tip speed data is received by control system 300, which utilizes a table or equation that relates generator 120 torque to an optimum or at least favorable tip speed ratio for the current twist distribution occurring at the current blade loading, both of which are also sensed by suitable sensors (not shown). The equation or table can be empirically determined or calculated using known physical laws. Control system 300 controls generator 120 torque in accordance to the equation or table to produce a rotor 106 speed that provides the optimum or at least a favorable power coefficient. This technique can be used to augment a below-rated pitch schedule or used alone to restore energy capture to levels closer to the entitlement associated with an uncoupled blade.

In some configurations, twist angles of blades resulting from passive twist bend coupling design are reduced, limited and/or controlled. The reduction, limitation and/or control can be applied in conjunction with a rotor blade 108 with laminates lay-up 402 designed for TBC. For example, referring to a rotor blade 108, some configurations of the present invention include a passive TBC section 402 and two shear webs 404 and 406 shown in FIG. 4. Also identified for reference in FIG. 4 are leading edge 410 and trailing edge 408 of rotor blade 108. In some configurations and referring to FIG. 5, which shows section A—A of FIG. 4 in greater detail, dampeners 502 are provided to attenuate twist angle bending motion. One example of a suitable dampener 502 is a shock absorber. Some configurations of the present invention have limiters 504 that are configured to limit twist angle bending. One example of a suitable limiter 504 is a cylinder with limited travel. Still other configurations provide actuators 506 that actively control the passive twist angle bending. Some examples of actuators 506 include electrically or hydraulically driven jackscrews and pneumatic or hydraulic cylinders. Yet other configurations provide various combinations of dampeners 502, limiters 504, and/or actuators 506, as are shown in FIG. 5. For example, by combining a shock absorber 502 with a cylinder 504 with limited travel, a dampening limiter is realized in some configurations of the present invention. Limiters 504, actuators 506, and particularly dampeners 502 may also benefit blade performance in some configurations of the present invention by reducing tip flutter resulting from Vonkommon vortex shedding. In various configurations, limiters 504, actuators 506 and/or dampeners 502 are attached to blade spars. As used herein, the term "Twist-Bend Control System" (TCS) is used to refer to a system that includes one or any combination of dampening, limiting, and actuating features.

Figure 6:
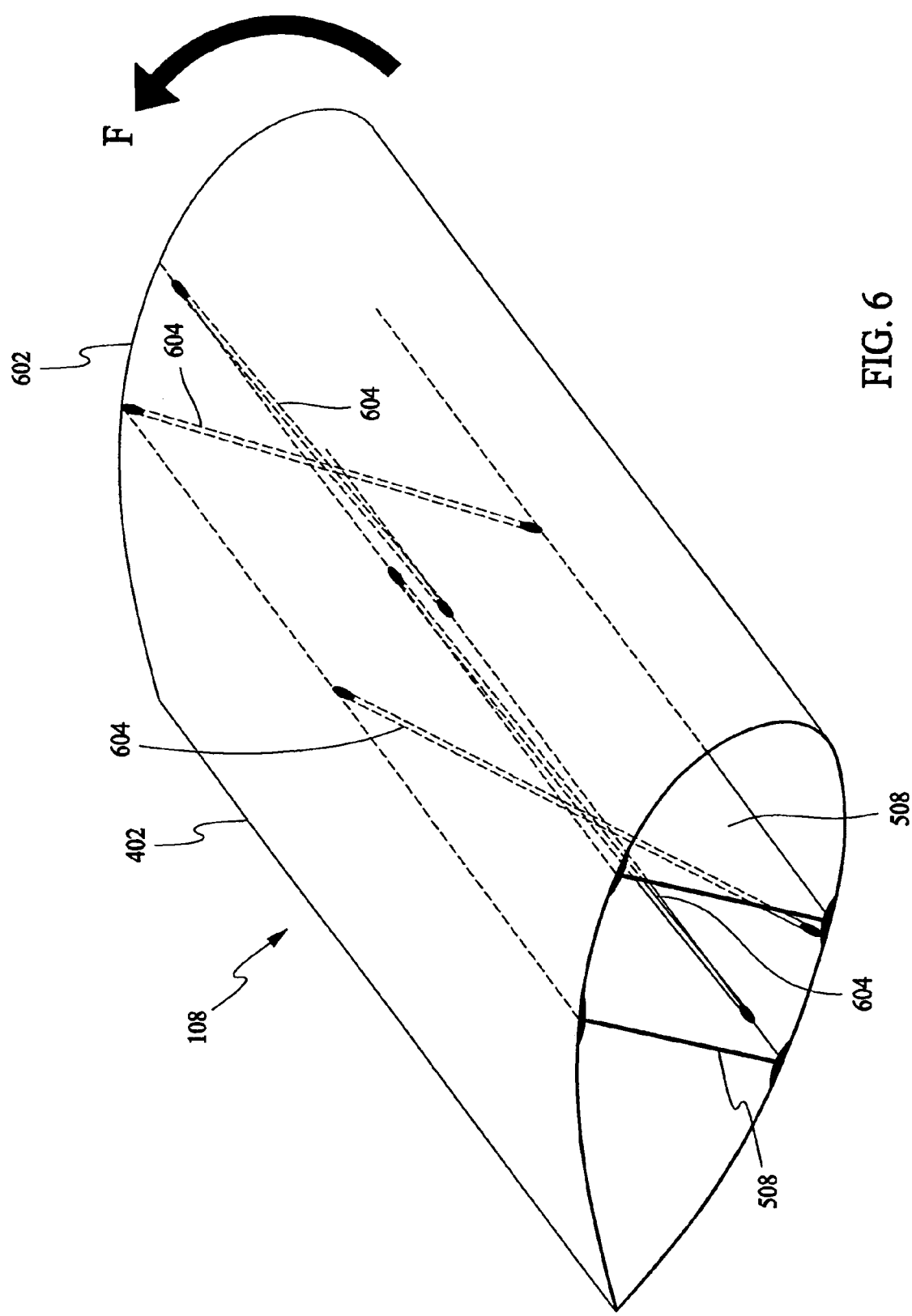
FIG. 6 is a sectional perspective view of the twist-bend coupled section of the rotor blade shown in FIG. 4, with certain interior portions indicated by dashed lines.

A sectional perspective view of a TBC section 402 of a rotor blade 108 is shown in FIG. 6. As a result of the passive laminate lay-up configuration of TBC section 402, a moment force F producing a twist towards a feathering position rotor blade 108 (of which TBC section 402 is a part) is created near an outboard section 602 of coupling 402. Also, in some configurations, the TCS comprises one or more TCS arms 604. TCS arms 604 include at least one of a linearly actuated dampener, a limiter, or an actuator, not separately shown in FIG. 6, but examples of which appear in FIG. 5. Each TCS arm 604 is oriented parallel to an axis opposing passive twist moment F resulting from the TBC. FIG. 6, for example, shows four TCS arms 604 orientated diagonally from a base of one shear web 508 to a top on another shear web 508 and also spanning outward to approximately align with a twisting pitch moment force F of the TBC. In addition, TCS arms 604 are secured to rotor blade 108 near a top or bottom of shear webs 508, although different mounting points from those shown here can be used in other configurations.

It will be observed that configurations of the present invention not only provide wind turbines with greater energy capture, but also mitigate risks associated with shear fatigue of laminates used in twist bend coupled rotor blades.

While the invention has been described in terms of various specific embodiments, those skilled in the art will recognize that the invention can be practiced with modification within the spirit and scope of the claims.

What is claimed is:

1. A method for controlling a wind turbine having twist bend coupled rotor blades on a rotor mechanically coupled to a generator, said method comprising:

determining a speed of a rotor blade tip of the wind turbine;

measuring a current twist distribution and current blade loading; and adjusting a torque of a generator to change the speed of the rotor blade tip to thereby increase an energy capture power coefficient of the wind turbine.

2. A method in accordance with claim 1 further comprising utilizing a table or equation relating generator torque to a favorable tip speed ratios for a current twist distribution and a current blade loading.

3. A method in accordance with claim 1 used to augment a below-rated pitch schedule.

4. A method in accordance with claim 1 wherein the rotor blades are of a passive twist bend coupling design, and said method further comprises at least one of reducing, limiting or controlling twist angles of the rotor blades resulting from passive twist bend coupling.

5. A method in accordance with claim 4 wherein said reducing limiting or controlling twist angles of the rotor blades comprises providing dampeners to attenuate twist angle bending.

6. A method in accordance with claim 4 wherein said reducing limiting or controlling twist angles of the rotor blades comprises providing limiters to limit twist angle bending.

7. A method in accordance with claim 4 wherein said reducing limiting or controlling twist angles of the rotor blades comprises providing actuators to control twist angle bending.

8. A twist-bend coupled rotor blade for a wind turbine, said rotor blade comprising:

a leading edge and a trailing edge;

a laminate lay-up configured for twist-bend coupling;

a passive twist-bend coupling section;

one or more shear webs inside the rotor blade; and a twist-bend control system inside the passive twist-bend coupling section.

9. A rotor blade in accordance with claim 8 wherein the twist-bend control system comprises a dampener.

10. A rotor blade in accordance with claim 9 wherein the dampener is a shock absorber.

11. A rotor blade in accordance with claim 8 wherein the twist-bend control system comprises a limiter.

12. A rotor blade in accordance with claim 11 wherein the limiter is a cylinder with limited travel.

13. A rotor blade in accordance with claim 8 wherein the twist-bend control system comprises an actuator.

14. A rotor blade in accordance with claim 13 wherein the actuator is a jackscrew.

15. A rotor blade in accordance with claim 13 wherein the actuator is a pneumatic or hydraulic cylinder.

16. A rotor blade in accordance with claim 8 having a plurality of twist-bend control system arms oriented parallel to an axis opposing a passive twist moment resulting from twist bend control.

17. A rotor blade in accordance with claim 16 having four twist-bend control system arms oriented diagonally from a base of one of said shear webs to a top of another said shear web and spanning outward to approximately align with the passive twist moment.

18. A wind turbine having twist bend coupled rotor blades on a rotor mechanically coupled to a generator, said wind turbine also having a controller configured to:

determine a speed of a tip of a rotor blade;

measure a current twist distribution and current blade loading; and adjust a torque of the generator to change the speed of the rotor blade tip to thereby increase an energy capture power coefficient of the wind turbine.

19. A wind turbine in accordance with claim 18 wherein said controller is further configured to utilize a table or equation relating generator torque to a favorable tip speed ratios for a current twist distribution and a current blade loading.

20. A wind turbine in accordance with claim 18 wherein the rotor blades are of a passive twist bend coupling design, and further configured to at least one of attenuate, limit or control twist angles of the rotor blades resulting from twist bending of the passive twist bend coupling.

21. A wind turbine in accordance with claim 20 wherein to attenuate, limit, or control twist angles of the rotor blades, said wind turbine further comprises dampeners configured to attenuate twist angle bending.

22. A wind turbine in accordance with claim 20 wherein to reduce, limit, or control twist angles of the rotor blades, said wind turbine further comprises limiters configured to limit twist angle bending.

23. A wind turbine in accordance with claim 20 wherein said reducing limiting or controlling twist angles of the rotor blades comprises providing actuators to control twist angle bending.

24. A wind turbine having a generator, a rotor mechanically coupled to said generator, and twist-bend coupled rotor blades on said rotor, said blades comprising:
 a leading edge and a trailing edge;
 a laminate lay-up configured for twist-bend coupling;
 a passive twist-bend coupling section;
 at least one shear webs inside the rotor blade; and
 a twist-bend control system inside the passive twist-bend coupling section.

25. A wind turbine in accordance with claim 24 wherein the twist-bend control system comprises a dampener.

26. A wind turbine in accordance with claim 25 wherein the dampener is a shock absorber.

27. A wind turbine in accordance with claim 24 wherein the twist-bend control system comprises a limiter.

28. A wind turbine in accordance with claim 27 wherein the limiter is a cylinder with limited travel.

29. A wind turbine in accordance with claim 24 wherein the twist-bend control system comprises an actuator.

30. A wind turbine in accordance with claim 29 wherein the actuator is a jackscrew.

31. A wind turbine in accordance with claim 29 wherein the actuator is a pneumatic or hydraulic cylinder.

32. A wind turbine in accordance with claim 24 wherein each said blades have a plurality of twist-bend control system arms oriented parallel to an axis opposing a passive twist moment resulting from twist bend control.

33. A wind turbine in accordance with claim 32 wherein each said blade has four twist-bend control system arms oriented diagonally from a base of one of said shear webs to a top of another said shear web and spanning outward to approximately align with the passive twist moment.

\* \* \* \* \*